(12) United States Patent
Nam

(10) Patent No.: US 6,937,645 B2
(45) Date of Patent: Aug. 30, 2005

(54) COMMUNICATION SYSTEM AND A RECEIVER FOR USE IN THE SYSTEM

(75) Inventor: Sueng-il Nam, New Malden (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 753 days.

(21) Appl. No.: 09/773,413

(22) Filed: Feb. 1, 2001

(65) Prior Publication Data

US 2001/0015999 A1 Aug. 23, 2001

(30) Foreign Application Priority Data

Feb. 23, 2000 (GB) .............................................. 0004123

(51) Int. Cl.[7] .............................................. H04B 1/707
(52) U.S. Cl. ...................................................... 375/148
(58) Field of Search ................................ 375/130, 147, 375/140–142, 146–148, 150, 316, 346–347, 144

(56) References Cited

U.S. PATENT DOCUMENTS

| | | | |
|---|---|---|---|
| 5,539,781 A | 7/1996 | Matsuura | 375/347 |
| 5,652,764 A | 7/1997 | Kanzaki et al. | 375/200 |
| 5,903,556 A | 5/1999 | Matui | 370/342 |
| 6,069,912 A * | 5/2000 | Sawahashi et al. | 375/142 |
| 6,356,528 B1 * | 3/2002 | Lundby et al. | 370/209 |
| 6,360,080 B1 * | 3/2002 | Yun et al. | 455/70 |

* cited by examiner

*Primary Examiner*—Kevin Burd
(74) *Attorney, Agent, or Firm*—Dicran Halajian

(57) ABSTRACT

A communication system economically mitigates the frequency-selective multipath effects and co-channel interference in wireless LANS. The communication system comprising a wireless local area network (LAN) formed by a plurality of spacially separated transceivers (TR, TR'). Each of the transceivers has a transmitting section (10) for transmitting data by a combination of dual code spread spectrum techniques and a receiving section (12) for recovering the data. The receiving section (12) comprises a plurality of diversity antennas (ANT 1 to ANT n), an adaptive forward equal gain combiner (60) having a plurality of branches (62 to 74 and 62' to 74'), each branch being coupled to a respective one of the diversity antennas. The adaptive forward equal gain combiner (60) selects a signal in one of the branches as a reference signal and co-phases the signals in the remaining branches with the reference signal.

9 Claims, 4 Drawing Sheets

COMMUNICATION SYSTEM AND A RECEIVER FOR USE IN THE SYSTEM

Figure 1:
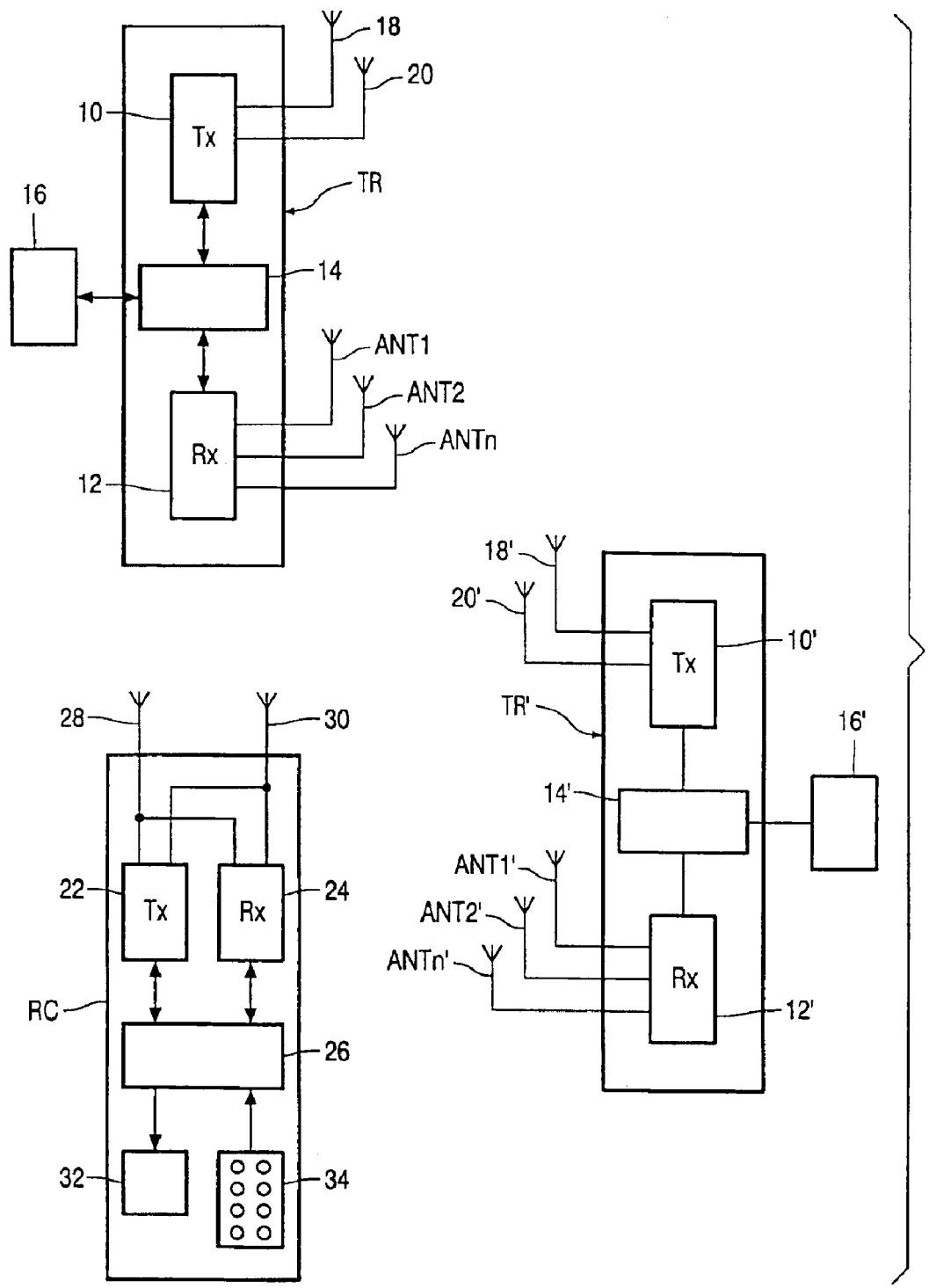

The present invention relates to a communication system and to a receiver for use in the system. The communication system has particular, but not exclusive, application to a short range wireless LAN for use in a domestic and office environment.

Short range wireless LANs based on protocols such as Bluetooth and HomeRF will typically operate in the 2.4 GHz ISM (Industrial, Scientific and Medical use) band which is also used for other applications such as RF heating. Problems which are present in such systems are frequency-selective multipath and co-channel interference. Such problems may affect the positioning of antennas which in a domestic environment the user will want them at aesthetically discrete locations.

A number of diversity and multiple mode radio communication systems have been proposed to combat multipath propagation channels. Recently the techniques to exploit multipath characteristics, instead of combating these characteristics, have been investigated using multiple transmitter antennas and sophisticated detection algorithms in the receiver. The techniques make use of antenna arrays with minimum distance of $\lambda/2$ between arrays. The techniques employ an individual modulator and demodulator for each branch, and transmit diversity performed by only one antenna array. Therefore there are hardware complexities and limitations to place transmit antenna. A multimode modulation technique is known which changes modulation scheme according to the varying propagation channel characteristics and this also will require a complex chain of hardware. The multimode techniques are applied in spread spectrum communications in which the separated quadrature related I-Q channels are spread with a predetermined PN code (the same pseudorandom sequence for each I-Q data stream), and experience a multi-quadrature modulation. For high bit rate transmission, multi-code parallel spread spectrum system is disclosed in a U.S. Pat. No. 5,903,556, where the system uses phase shifted versions of the same pseudorandom sequences for each of several parallel I-Q data streams. This technique does not exploit multipath effect. Known types of receivers for receiving multipath signals are based on Rake receivers in which the received signals are applied to several parallel branches. The first of the received signals is taken as a reference and adjustable time delays are introduced into the respective branches so that all the signals are substantially in-phase prior to their being combined. The hardware required by a Rake receiver is relatively complex and expensive which makes it unsuitable for low cost applications.

An object of the present invention is to mitigate the frequency-selective multipath effects and co-channel interference in wireless LANs using relatively inexpensive equipment.

According to one aspect of the present invention there is provided a receiver for receiving a dual code spread spectrum signal, comprising a plurality of diversity antennas, an adaptive forward equal gain combiner having a plurality of branches, each branch being coupled to a respective one of said diversity antennas, means for splitting an output from the combiner into two output channels, means for demodulating the signals in the output channels, means for correlating the signals in each of the output channels with respective ones of the dual spreading codes and means for recovering data from the correlated signals.

According to a second aspect of the present invention there is provided a communication system comprising first and second transceivers, one of the first and second transceivers having a transmitting section for transmitting dual code spread spectrum signals, and the other of the first and second transceivers having a receiving section comprising antenna diversity means for receiving the signals propagated by said one of the first and second stations, the antenna diversity means comprising a plurality of branches and means for co-phasing the signals in all but one of the branches with the signal in the one of the branches, means for combining the co-phased signals, means for respectively correlating the combined signals with first and second PN spreading codes used for spreading data streams in said transmitting section and means for recovering data from the correlated signals.

Figure 2:
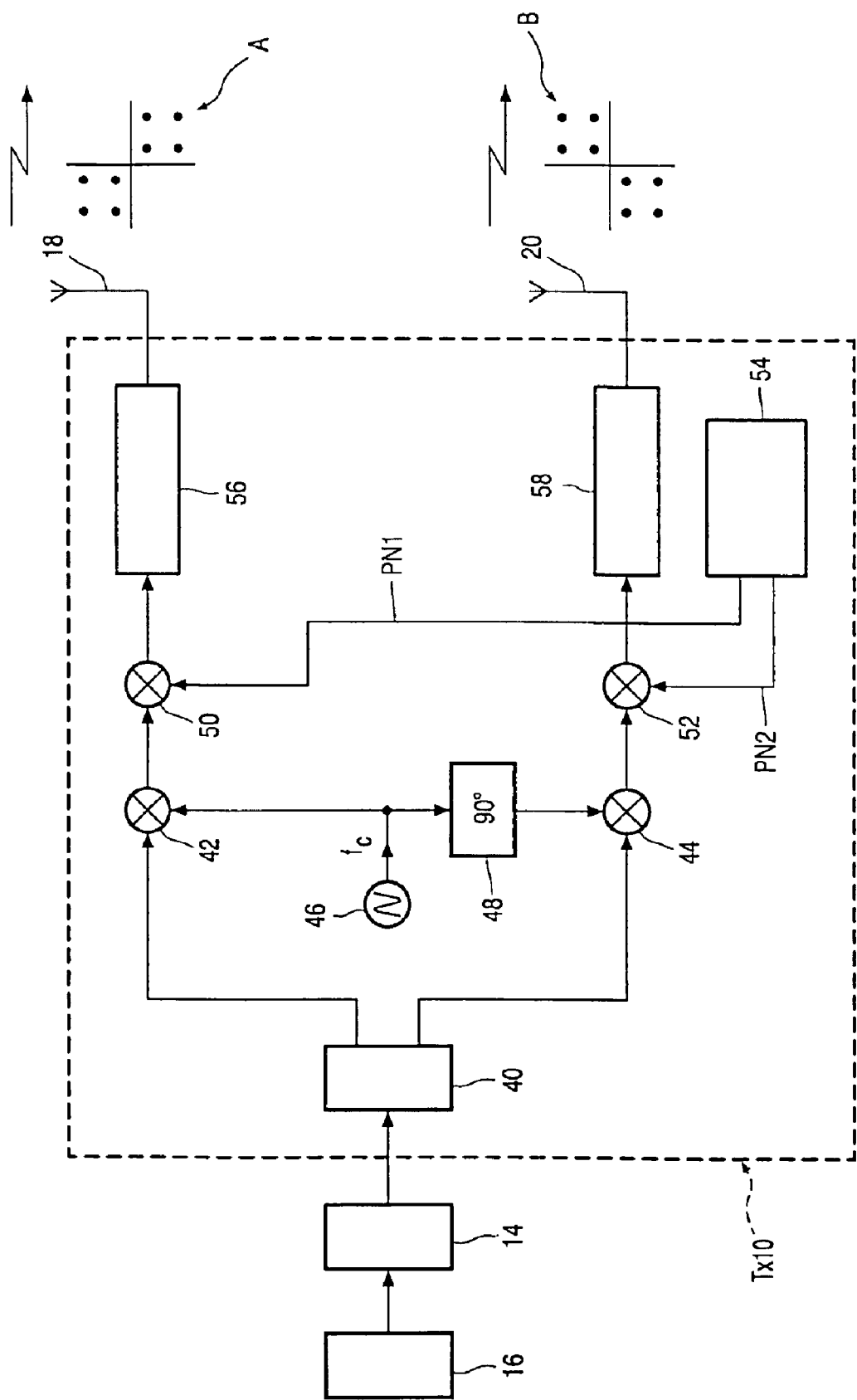
Figure 3:
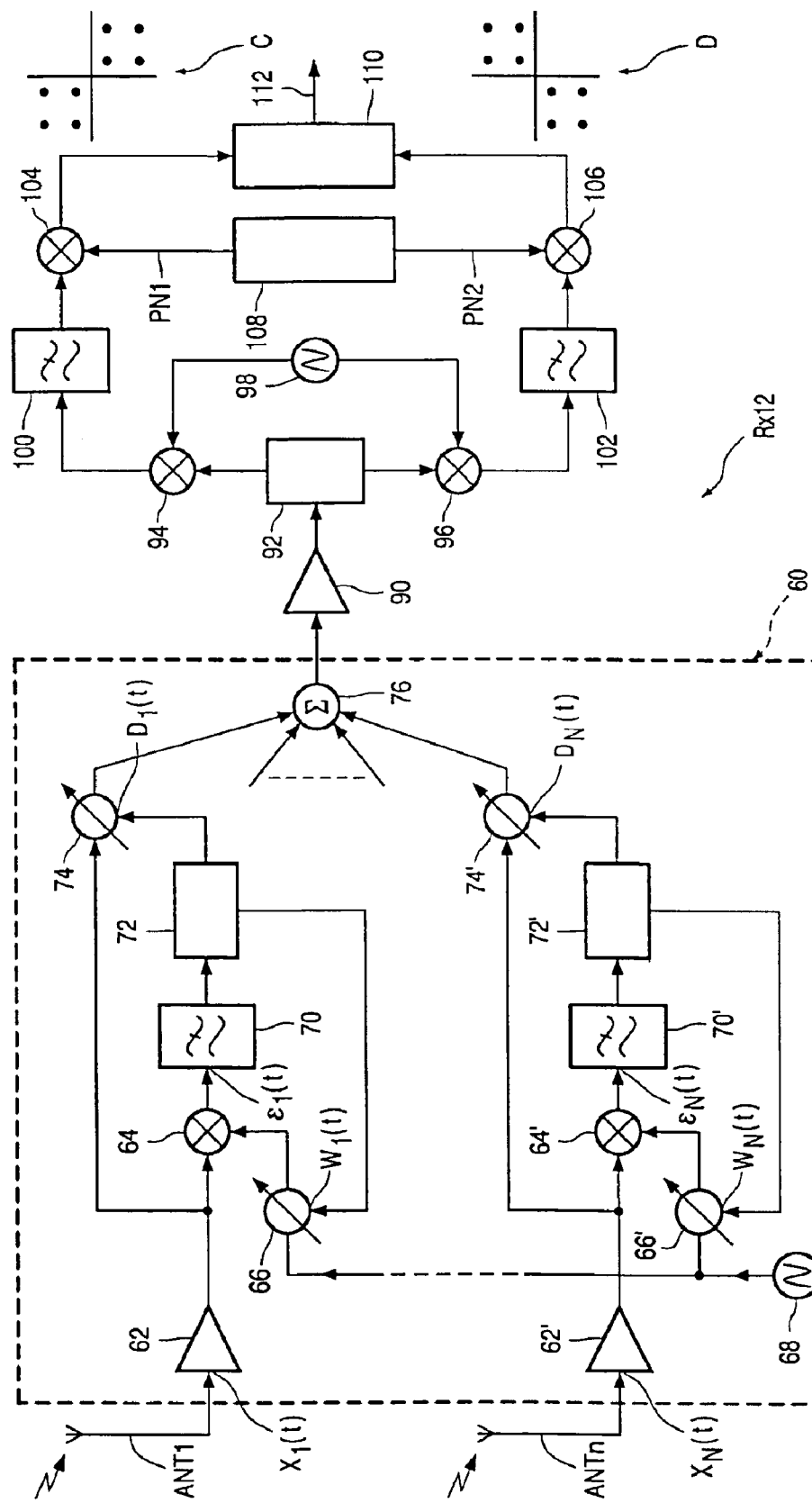
Figure 4:
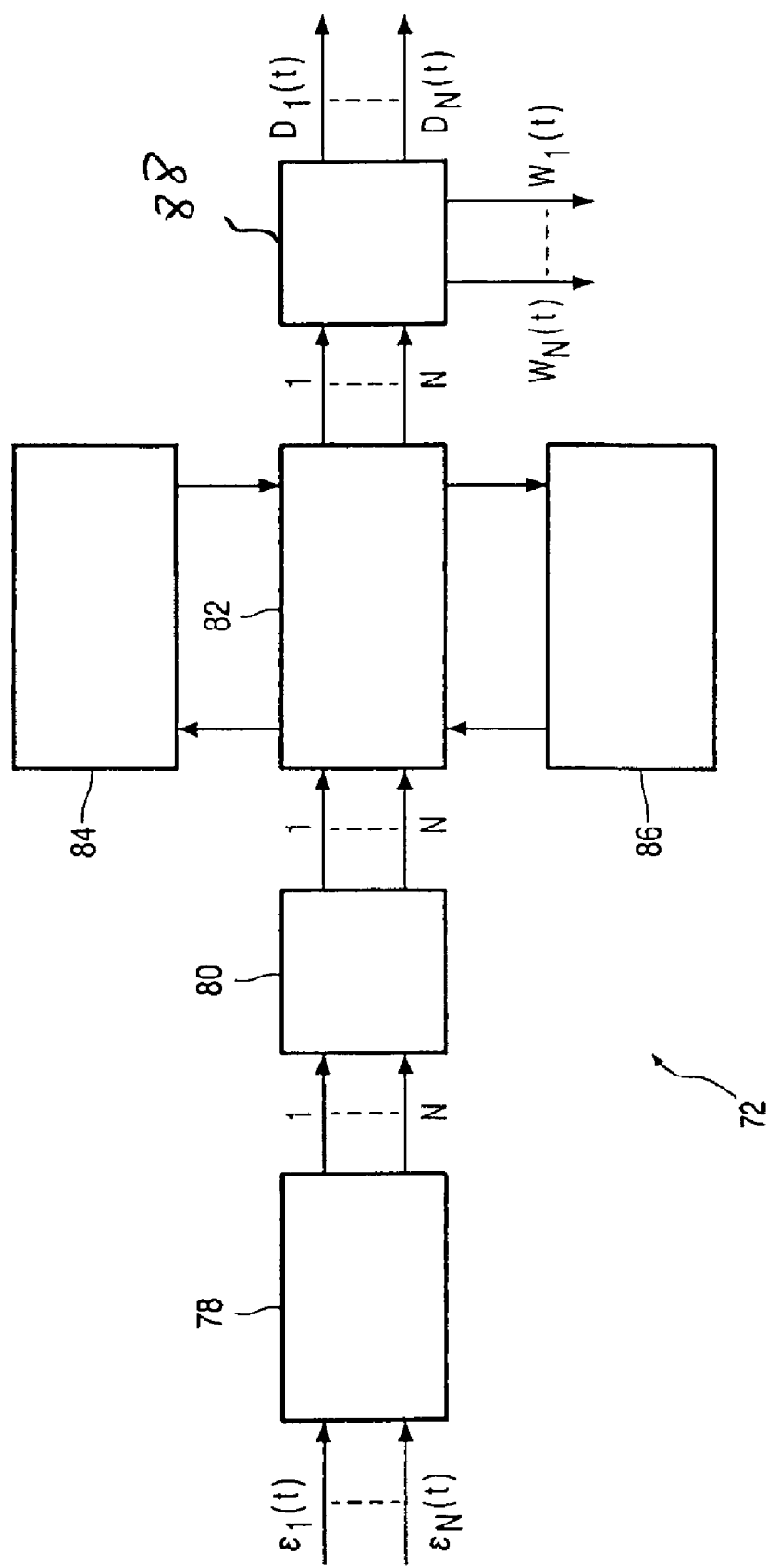

The present invention will now be described, by way of example, with reference to the accompanying drawings, wherein:

FIG. 1 is a block schematic diagram of a wireless LAN comprising a plurality of transceivers of which only 2 are shown, FIG. 2 is a block schematic diagram of a dual code spread spectrum transmitter using transmit vector diversity, FIG. 3 is a block schematic diagram of a dual code spread spectrum vector receiver with adaptive forward blind equal-gain combiner, and FIG. 4 is a block schematic diagram of a weighting controller suitable for use in the receiver shown in FIG. 3.

In the drawings the same reference numerals have been used to indicate corresponding features.

The wireless LAN shown is FIG. 1 comprises a wireless remote controller RC and at least two transceivers TR, TR' which may be stand alone transceivers coupled to respective input/output apparatus such as a TV set, Hi-Fi system, set top box or personal computer or integrated into such apparatus.

Since the transceivers TR, TR' are identical only the transceiver TR will be described in greater detail and the same reference numerals with a prime will be used to indicate the corresponding parts of the transceiver TR'.

A transmitter (Tx) 10 and a receiver (Rx) 12 are coupled to a processor 14 which controls the Tx10 and Rx12 as well as processing data relayed to or received from an input/output apparatus 16. The Tx10 is a dual code spread spectrum transmitter using transmit vector diversity in which each symmetrical constellation of signals is propagated by respective antennas 18, 20. A plurality of antennas ANT1 to ANTn, where n is an integer of 2 or more, are coupled to the Rx12 which has an architecture consisting of an adaptive forward blind equal-gain combiner and dual-code spread spectrum receiver. Since the transceivers TR, TR' are static, their antennas 18, 20, ANT1 to ANTn can be located at any suitable positions.

The remote controller RC comprises a transmitter 22 and a receiver 24 which are coupled to and controlled by a processor 26. The transmitter 22 and receiver 24 may be of the same architecture as the Tx 10 and RX 12 but share the same antennas 28, 30. The remote controller RC further comprises a LCD display panel 32 with associated drivers (not shown) and a keypad 34 which constitutes a man/machine interface (MMI).

In operation a user with the remote control RC can operatively link the transceivers TR, TR' so that they can communicate with each other relaying data into and out of their respective input/output apparatus 16, 16'.

Referring to the transmitter 10 shown in FIG. 2 data from the apparatus 16 is sent to the processor 14 in which it is encoded as a data stream having a predetermined number of levels depending on the modulation scheme, for example 2 levels for 16 QAM (Quadrature Amplitude Modulation) and supplied to a quadrature data splitter 40 which provides an I (or in-phase) channel data stream and a Q (or quadrature phase) channel data stream. The I, Q data streams are applied to first inputs of respective mixers 42, 44. A carrier signal $f_c$ which may be either at an RF carrier frequency or at an IF carrier frequency is generated by a frequency generator 46. The carrier signal $f_c$ is applied to a second input of the mixer 42 and, by way of a 90 degree phase shifter 48, to a second input of the mixer 44 to modulate respectively the I and Q data streams. The modulated I and Q data streams are applied to respective multipliers 50, 52 to which different PN codes PN1, PN2, generated by a parallel PN code generator 54, are applied to produce respective spread spectrum signals. The multipliers 50, 52 are coupled to inputs of respective RF units 56, 58, the outputs of which are coupled respectively to the antennas 18, 20. If the carrier frequency $f_c$ generated by the frequency generator 46 is at the RF carrier frequency then the RF units 56, 58 will be power amplifying stages. However if the carrier frequency $f_c$ is at an IF, then the RF units 56, 58 will comprise a frequency up-conversion stage and a power amplifier. In the latter case the RF units 56, 58 will have individual RF frequency signal sources thereby enabling the antennas 18, 20 to be located anywhere in the radio coverage area. The constellations of the signals propagated by the antennas 18, 20 are shown at diagrams A and B in FIG. 2.

One effect of being relaxed over the location of the antennas 18, 20 is that in the worst case of anti-phase carrier transmission at the instant of transmitting, the two signals will undergo different phase and time delay due to different multipath reflections by different transmitter antenna locations. Accordingly an intelligent receiver capable of recognising the phase variation needs to treat the initial phase difference as an effect of multipath and will need to adaptively correct for these phase differences.

FIG. 3 illustrates the receiver 12 which includes an intelligent adaptive combiner 60 which is applies combining algorithms to adaptively correct the phase until a maximum signal power is obtained. The receiver 12 comprises a plurality of the antennas ANT1 to ANTn which receive the transmitted signals $X_1(t)$ to $X_n(t)$, respectively, and apply them respective phase adjusting branches. As the architecture of each of the phase adjusting branch is substantially identical, only one of them will be described in detail and primed reference numerals will be used to identify the corresponding components in the other branches.

Each of the branches comprises a low noise amplifier (LNA) 62 whose input is coupled to its antenna ANT1. The output of the LNA 62 is split into two paths. A first of the two paths is coupled to a first input of a direct conversion multiplier 64 whose second input is coupled to a first phase shifter 66 whose input is obtained from the output a local oscillator 68 producing the rf carrier frequency which is common to all the branches. An output of the multiplier 64, which comprises a difference or error signal $\epsilon_1(t)$, is filtered in a low pass filter 70 to remove unnecessary high order harmonics and its output is applied to a weighting controller 72 which controls the first phase shifter 66. A second of the two paths is coupled to a second phase shifter 74 which is controlled by the weighting controller 72. The outputs of the second phase shifters 74, 74' are combined in a summing stage 76.

For convenience, the operation of the adaptive combiner will be described before describing the remainder of the receiver.

The signals $X_1(t)$ to $X_N(t)$ received by the respective antennas ANT1 to ANTn are amplified in the respective LNAs 62, 62' and mixed down to baseband in the multipliers 64, 64'. The phase of the local oscillator signal applied to each of the mixers 64, 64' is adjusted by the first phase shifter 66, 66' in response to a respective weighting signal $W_1(t)$, $W_N(t)$ supplied by the weighting controller 72, 72'. It will be recalled that the weighting signal on each branch will be different as the phases of the incoming received signals are varying according to their path directions. The weighting signal $W_1(t)$, $W_N(t)$ when finally determined, as will be described below, acts as information to trace the real decision weighting factors $D_1(t)$, $D_N(t)$ supplied to the second phase shifters 74, 74' by the respective weighting controllers 72, 72'. The values of the real decision weighting factors $D_1(t)$, $D_N(t)$ are determined to enable the incoming received signals on each branch to be co-phased with each other. The summed signal from the N branches appearing at the output of the summing stage 76 demonstrates an increased signal power.

The weighting controllers 72, 72' determine the values of the weighting signals $W_1(t)$, $W_N(t)$ and the real decision weighting factors $D_1(t)$, $D_N(t)$ without the need for a prior known reference signal. Referring to FIG. 4 which shows an embodiment of a weighting controller 72. The weighting controller 72 may be adapted as shown to act as a centralised weighting controller which replaces the weighting controller in each of the branches. The error voltages $\epsilon_1(t)$ to $\epsilon_N(t)$ are applied in parallel to a level detector 78, the outputs of which are applied to an analogue to digitial converter (ADC) 80 which in turn is coupled to a controller 82. A first look-up table 84 storing accurate measurements of phase shifts which are used to provide values of the weighting signals $W_N(t)$ and a second look-up table 86 storing values of the real decision weighting factors $D_N(t)$ obtained by comparing the phase deviations between the received signals on the respective branches are coupled to the controller 82. The controller 82 supplies these weighting signals and weighting factors to a digital-to-analogue converter (DAC) 88 which applies the respective weighting signals $W_1(t)$ to $W_N(t)$ and the respective weighting factors $D_1(t)$ to $D_N(t)$ to the respective first and second phase shifters 66, 66' and 74, 74'.

The procedure to find both the weighting signals $W_1(t)$ to $W_N(t)$ and the weighting factors $D_1(t)$ to $D_N(t)$ is as follows:

(1) Using statistical propagation data, the weighting signals $W_1(t)$ to $W_N(t)$ for controlling the first phase shifters 66, 66' will be initialised with continuous step voltage from 0° to 180° phase difference on each branch. In the case of N=4, the initial phase shift on branch 1 is 45°, branch 2 is 90°, branch 3 is 135° and branch 4 is 180°.

(2) The weighting controller 72 (or controllers if there is one in each branch) changes (or change) the value of the weighting signal until the respective multipliers 64 to 64' generates a minimum error voltage, $\epsilon_N(t)_{min}$. This minimum error voltage will be detected when the respective phase shifted local oscillator frequency is co-phased with the received peak signal in that branch.

(3) When $\epsilon_N(t)_{min}$ is obtained for a respective branch, its value is digitised in the ADC 80 and applied to the controller 82 which applies an corresponding input to the first look-up table 84 in order to determine the phase deviation of the incoming received signal from the local oscillator frequency. A digital value read-out from the first look-up table 84 is applied by way of the controller 82 to the DAC 88 which provides the analogue weighting signal $W_N(t)$.

(4) Among the N incoming received signals, only one received signal will have the lowest minimum phase deviation with respect to the local oscillator frequency and is selected as a reference signal.

(5) This reference signal is applied to the second look-up table 86 which produces a corresponding output which is used by the controller to generate the real weighting factor $D_N(t)$. This real weighting factor $D_N(t)$ is applied to the second phase shifters 74, 74' as a phase control voltage which co-phases their respective received carrier signals to the selected reference signal.

As a result the signals combined in the summing stage 76 are co-phased.

Referring to FIG. 3, the output of the summing stage 76 is amplified in an amplifier 90. An in-phase splitter 92 is coupled to an output of the amplifier 90 and provides outputs to first inputs of mixers 94, 96, respectively. A local oscillator 98 is applied to second inputs of the mixers 94, 96. Outputs of the mixers 94, 96 are coupled to respective low pass filters 100, 102, the outputs of which are coupled to first inputs of first and second correlators 104, 106.

A parallel PN code generator 108 applies the code PN1 to the second input of the correlator 104 and the code PN2 to the second input of the correlator 106. The outputs of the correlators 104, 106 correspond to the I-and Q-channel data streams which are of a complementary signal format as indicated by the constellation diagrams C and D and these data streams, are compared in an error detection stage 110 to derive the recovered data stream on terminal 112.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of the communication system and component parts therefor and which may be used instead of or in addition to features already described herein.

What is claimed is:

1. A receiver for receiving a dual code spread spectrum signal, comprising:
    a plurality of diversity antennas,
    an adaptive forward equal gain combiner having a plurality of branches, each branch being coupled to a respective one of said diversity antennas, each diversity antenna receiving a respective carrier signal,
    wherein said combiner comprises:
        means for selecting a signal in one of said branches as a reference signal,
        means for co-phasing the carrier signals in each of the respective branches with the reference signal,
        means for splitting an output from the combiner into two output channels,
        means for demodulating the signals in the output channels,
        means for correlating the signals in each of the output channels with respective ones of the dual spreading codes and means for recovering data from the correlated signals.

2. A receiver as claimed in claim 1, wherein each branch comprises:
    a multiplier having a first input for a signal from its antenna and a second input for a phase adjusted local oscillator signal and an output for a difference signal,
    a filter for removing high order harmonics from the difference signal,
    a weighting controller having means for producing a weighting signal which is applied to a first phase shifter for adjusting the phase of the local oscillator signal and a weighting factor related to the selected reference signal,
    a second phase shifter having an input for a signal derived from the antenna, said second phase shifter having an input for the weighting factor whereby the input signal is co-phased with the selected reference signal, and
    a signal combiner for combining the selected reference and co-phased signals from the respective branches.

3. A receiver as claimed in claim 1, wherein a centralized weighting controller comprises for each of said branches:
    a multiplier having a first input for a signal from its antenna and a second input for a phase adjusted local oscillator signal and an output for a difference signal,
    a filter for removing high order harmonics from the difference signal,
    a weighting controller having means for producing a weighting signal which is applied to a first phase shifter for adjusting the phase of the local oscillator signal and a weighting factor related to the selected reference signal,
    a second phase shifter having an input for a signal derived from the antenna, said second phase shifter having an input is for the weighting factor whereby the input signal is co-phased with the selected reference signal, and
    a signal combiner for combining the selected reference and co-phased signals from the respective branches.

4. A receiver as claimed in claim 3, wherein the weighting controller comprises a controller for receiving digitized filtered outputs of the respective multipliers, a first memory means storing the weighting signals coupled to the controller, a second memory means storing the weighting factors coupled to the controller, the controller having an outputs coupled respectively to the first and second phase shifters.

5. A receiver for receiving a dual code spread spectrum signal, comprising:
    a plurality of diversity antennas,
    an adaptive forward equal gain combiner having a plurality of branches, each branch being coupled to a respective one of said diversity antennas,
    wherein each of said branches comprises:
        frequency down conversion means and phase compensating means, wherein a local oscillator is coupled to each of said compensating means, and wherein each of said phase compensating means comprises:
        means for adjusting the phase of the local oscillator to minimize the phase difference between the adjusted phase of the local oscillator frequency and the phase of the signal received by the respective branch, and
        means for selecting the branch having a minimum phase deviation with respect to the local oscillator frequency and treating that signal as a reference signal,
        means for splitting an output from the combiner into two output channels,
        means for demodulating the signals in the output channels,
        means for correlating the signals in each of the output channels with respective ones of the dual spreading codes and means for recovering data from the correlated signals.

6. A communication system having a receiver for receiving a dual code spread spectrum signal, said receiver comprising:
- a plurality of diversity antennas,
- an adaptive forward equal gain combiner having a plurality of branches, each branch being coupled to a respective one of said diversity antennas, each diversity antenna receiving a respective carrier signal,
- wherein said combiner comprises:
  - means for selecting a signal in one of said branches as a reference signal,
  - means for co-phasing the carrier signals in each of the respective branches with the reference signal,
  - means for splitting an output from the combiner into two output channels,
  - means for demodulating the signals in the output channels, and
  - means for correlating the signals in each of the output channels with respective ones of the dual spreading codes and means for recovering data from the correlated signals.

7. A communication system as claimed in claim 6, wherein each branch comprises:
- a multiplier having a first input for a signal from its antenna and a second input for a phase adjusted local oscillator signal and an output for a difference signal,
- a filter for removing high order harmonics from the difference signal,
- a weighting controller having means for producing a weighting signal which is applied to a first phase shifter for adjusting the phase of the local oscillator signal and a weighting factor related to the selected reference signal,
- a second phase shifter having an input for a signal derived from the antenna, said second phase shifter having an input for the weighting factor whereby the input signal is co-phased with the selected reference signal, and
- a signal combiner for combining the selected reference and co-phased signals from the respective branches.

8. A communication system as claimed in claim 6, wherein a centralized weighting controller comprises for each of said branches:
- a multiplier having a first input for a signal from its s antenna and a second input for a phase adjusted local oscillator signal and an output for a difference signal,
- a filter for removing high order harmonics from the difference signal,
- a weighting controller having means for producing a weighting signal which is applied to a first phase shifter for adjusting the phase of the local oscillator signal and a weighting factor related to the selected reference signal,
- a second phase shifter having an input for a signal derived from the antenna, said second phase shifter having an input for the weighting factor whereby the input signal is co-phased with the selected reference signal, and
- a signal combiner for combining the selected reference and co-phased signals from the respective branches.

9. A communication system as claimed in claim 8, wherein the weighting controller comprises a controller for receiving digitized filtered outputs of the respective multipliers, a first memory means storing the weighting signals coupled to the controller, a second memory means storing the weighting factors coupled to the controller, the controller having an outputs coupled respectively to the first and second phase shifters.

* * * * *